July 9, 1968 D. E. BLAIR 3,392,158
APPARATUS AND PROCESS FOR FRACTIONATING A POLYMER
Filed Dec. 26, 1963 6 Sheets-Sheet 2

INVENTOR
DAVID E. BLAIR,

BY Edwin Tocker
AGENT

July 9, 1968 D. E. BLAIR 3,392,158
APPARATUS AND PROCESS FOR FRACTIONATING A POLYMER
Filed Dec. 26, 1963 6 Sheets-Sheet 3

INVENTOR
DAVID E. BLAIR
BY
Edwin Tocker
AGENT

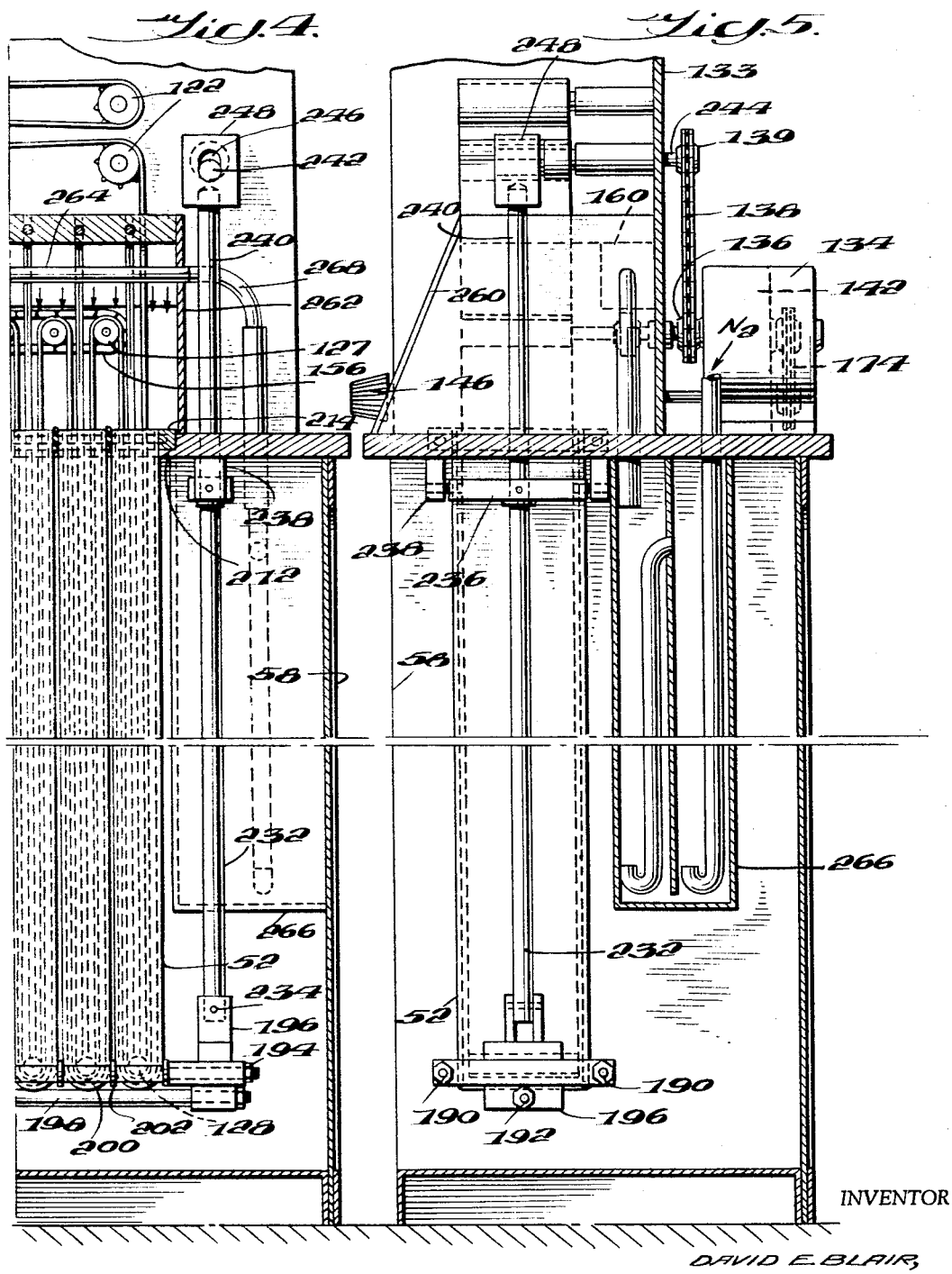

INVENTOR
DAVID E. BLAIR,
BY Edwin Tocker
AGENT

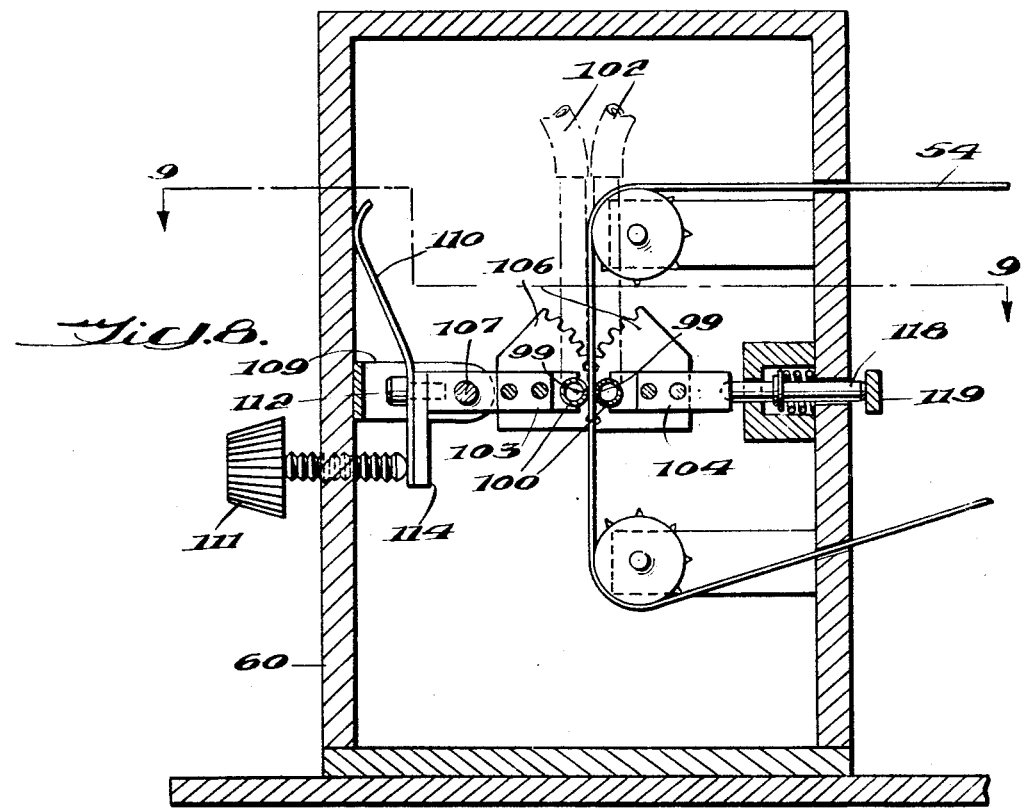
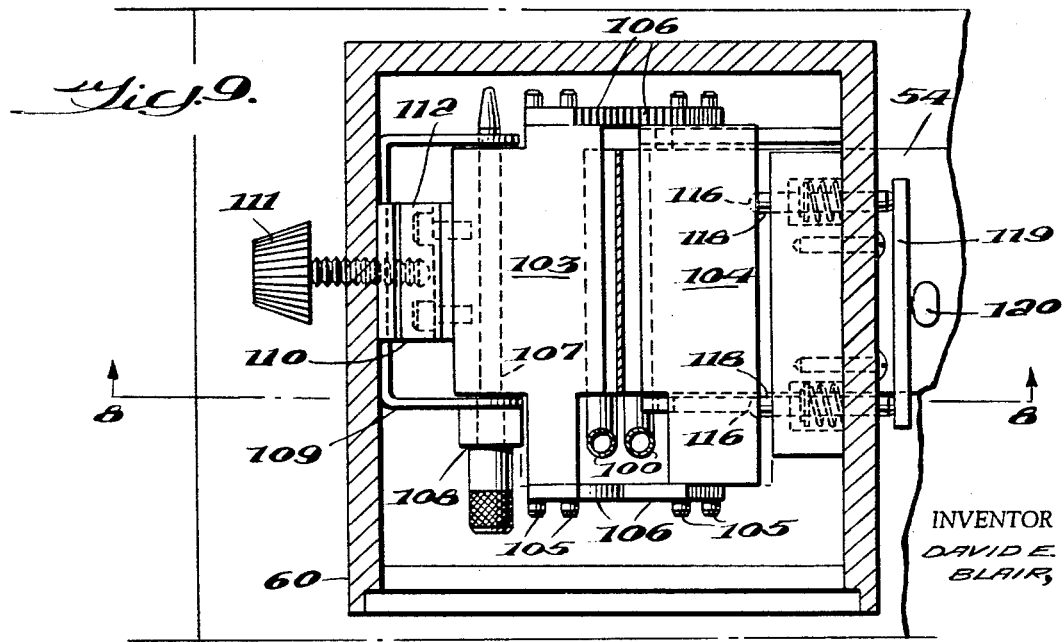

United States Patent Office 3,392,158
Patented July 9, 1968

3,392,158
APPARATUS AND PROCESS FOR FRACTION-
ATING A POLYMER
David Elmer Blair, Wilmington, Del., assignor to E. I. du
Pont de Nemours and Company, Wilmington, Del., a
corporation of Delaware
Filed Dec. 26, 1963, Ser. No. 333,328
8 Claims. (Cl. 260—92.3)

ABSTRACT OF THE DISCLOSURE

A process for separating a polymer into molecular weight fractions, together with apparatus therefor, comprising the steps of coating a substrate, such as, an endless solvent-resistant conveyor belt, with a polymer, passing the coated belt preferably continuously and simultaneously through a series of liquid solvent baths of increasing solvent strength relative to the polymer and concurrently agitating the contents of each bath by conjunctively moving the baths relative to the coated belt. Each range of polymer fraction may be separated from its respective bath by any appropriate means known in the art.

---

This invention relates to a continuous process by which material containing components of differing solubilities may be separated into fractions by the successive application of liquids having progressively changing solvent power for specific components and to an apparatus therefor and more particularly to a process and apparatus for fractionating polymers into different molecular weight fractions.

Heretofore, polymer fractionation by extraction with a solvent has usually been carried out on a polymer sample deposited on a substrate which is held stationary in a percolation zone. The solvent was usually added batchwise and fractions collected batchwise corresponding to the different solvents. Attempts made to convert these procedures to continuous processes have resulted in cumbersome operations which were not applicable to all polymers.

It is therefore an object of the present invention to provide a sequential separation process which requires a minimum of time and operator attention.

Another object is to provide a process for fractionating a polymer in a short period of time.

Another object is to provide a process which simultaneously as well as sequentially separates a polymer sample into fractions of relatively narrow molecular weight range.

A still further object is to provide a process for continuous polymer fractionation.

A still further object is to provide apparatus for achieving the foregoing objects.

And still another object is to provide a novel apparatus for subjecting material to repetitive treatment with fluids.

And still a further object is to provide a novel polymer fractionator apparatus. Other objects will appear hereinafter.

These and other objects will be better understood by reference to the following description and accompanying drawings in which:

FIG. 4 is a front elevation, partially in section, of the other end of the apparatus of FIG. 2;

FIG. 5 is a side elevation, partially in section, of the apparatus depicted in FIG. 4;

FIG. 8 is a side elevation, along line 8—8 of FIG. 9, of another embodiment of a polymer applying mechanism;

FIG. 9 is a plan view along line 9—9 of FIG. 8;

Figure 1:
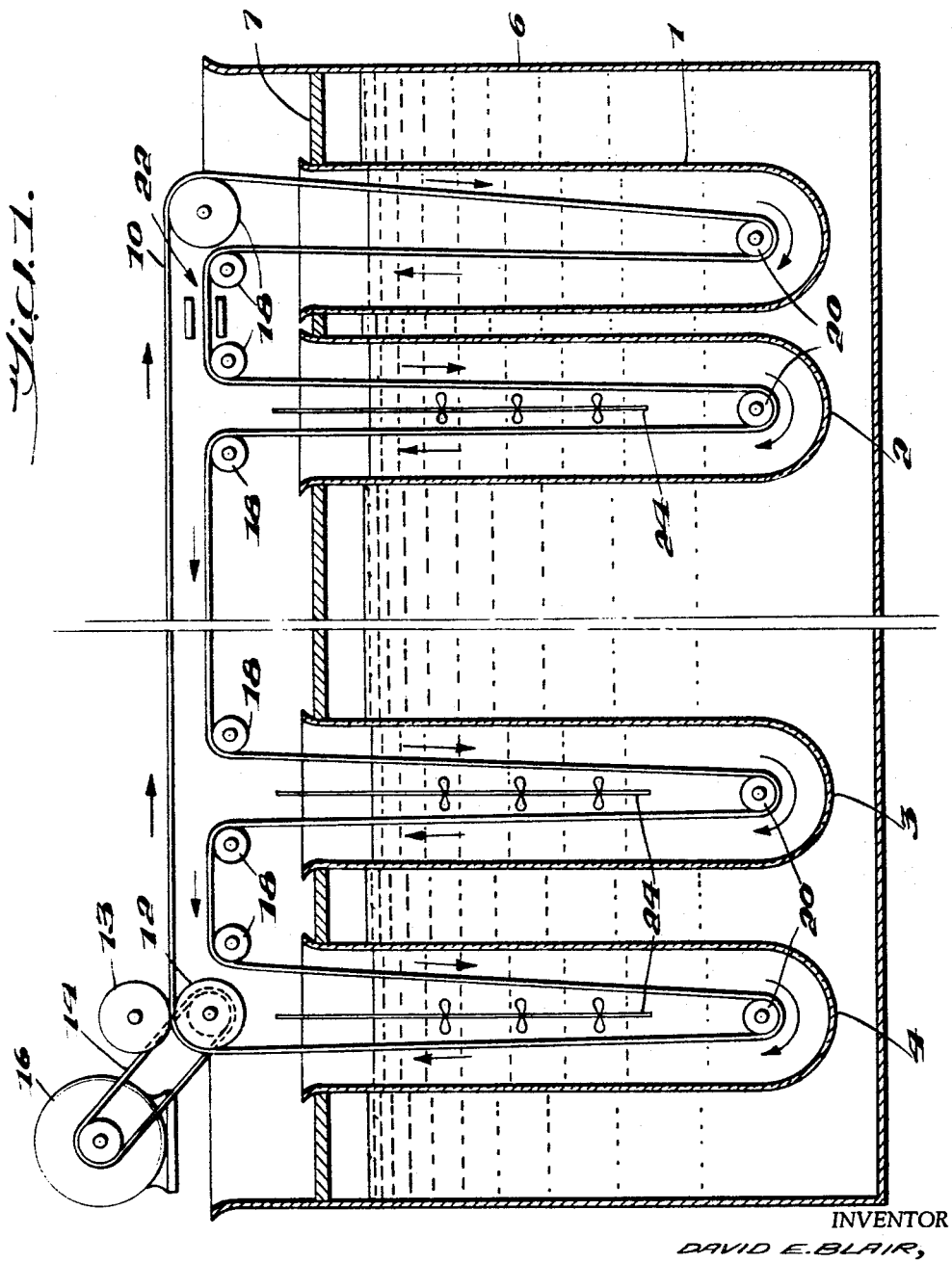
FIG. 1 depicts in schematic side elevation a representative apparatus for carrying out the process of the present invention.

The process of the present invention will be explained in the context of representative apparatus for its execution. FIG. 1 shows a number of containers 1, 2, 3, and 4 positioned in alignment in a constant temperature bath 6 by means of an apertured tube sheet 7. Container 1 contains a solution of the polymer to be fractionated. Containers 2, 3, and 4 hold liquids having progressively increasing solvent strength, starting from container 2, for the polymer solute of container 1. An endless conveyor belt 10 is conducted along a zig-zag course through each of the containers 1–4 by means of drive roller 12, driven by means of a belt 14 and motor-speed reducer 16, and upper and lower guide rollers 18 and 20, respectively. An idler pressure roller 13 is provided to press the belt 10 against roller 12 with sufficient force to obtain movement therewith.

In operation, a continuous coating of polymer is applied to the conveyor belt 10 as it is advanced through container 1 as shown. A drying zone 22 is provided intermediate containers 1 and 2 along the path of the belt 10 for removing excess or all of the polymer solvent obtained from the solution of container 1. As a portion of the polymer coating passes through container 2, the fraction having the lowest molecular weight is extracted. Sequentially higher molecular weight fractions are extracted as the polymer coating advances through the remaining containers 3 and 4.

In addition to polymer fractions of increasing molecular weight being sequentially removed from each portion of the polymer coating, successive portions thereof are simultaneously contacted with the solvents of all the containers 2–4 to effect simultaneous extraction of polymer fractions having different molecular weights which span the range of molecular weights contained in the polymer. The various polymer fractions can then be recovered from their respective solvents in containers 2–4 and the fraction size and molecular weight determined by conventional procedures. It is to be understood that each polymer fraction contains a range of molecular weights, albeit smaller than range of the unfractionated polymer, hence the terms "high," "low," and the like as applied to polymer fractions, refer to the relative average molecular weights thereof.

The conveyor belt 10 forming the substrate for the polymer coating should be made of a material which is resistant to the particular solvents being employed. Stainless steel mesh and some plastics, such as polyester film, are representative suitable belt materials.

The thickness of the polymer coating applied to conveyor belt 10 can be varied by adjusting the concentration of polymer in the polymer solution of container 1. Other methods of applying the polymer to the conveyor belt can be employed, such as by coating rollers and the like, and the polymer coating can be applied to only a portion of the width of the conveyor belt.

It is to be understood, of course, that the initial contacting solvent, viz. of container 2, is not of sufficient solvent strength to dissolve the entire polymer coating. Generally, the solvent contained in the last container of the series, container 4, is of sufficient solvent strength to strip the conveyor belt 10 of polymer coating so that a "clean" belt surface is returned to the polymer coating solution of container 1.

The speed of the conveyor belt 10 is such to provide sufficient residence time of the polymer coating in each container 2–4 for complete extraction of the molecular weight fractions to occur in their respective solvents. Agitation of the solvents is necessary to obtain this complete extraction within a reasonable time and can be provided such as by individual stirrers 24 depending in the containers 2–4 of FIG. 1.

According to the number of polymer fractions desired, any reasonable number of containers of fractionating solvent can be aligned in the bath 6 so long as the solvent strengths increase progressively from container 2. Instead of maintaining liquids of different solvent strength in the same relative temperature by means of bath 6, a single solvent or combination of solvents can be maintained at different relative temperatures to obtain the effect of progressively increasing solvent strength along the path of the conveyor belt. Additionally, solutions for removing polymerization salts, compounding ingredients, and the like, from the polymer coating can be employed in line with and preceding the containers 2–4.

The drying of the polymer coating in the drying zone 22 can be obtained by passing streams of inert gas, such as nitrogen, over the surface of the coating. Additional drying zones (not shown) can be employed between each of the containers 2–4 for the purpose of minimizing solvent carryover and mechanical rub-off of the solvent swollen polymer coating onto the rollers 18. However, when the polymer coating is allowed to remain swollen during transport between containers 2–4, better extraction occurs for a given belt speed for the reason that the polymers swelling which precedes extraction is already obtained. To prevent polymer unswelling during such transport, a hooded inert solvent saturated atmosphere can be provided over the constant temperature bath 6.

The following example is illustrative of the process of the present invention. The polymer being fractionated was polychloroprene which was prepared substantially as described in U.S. Patent No. 2,567,117.

The fractionation was conducted in equipment similar to that shown in FIG. 1. The following table shows the contents of the series of containers employed and the results obtained.

| Tube | Vol. percent Benzene in Benzene-Methanol | Weight (g.) | Weight Fraction | 30° $\eta_{inh}$ |
|---|---|---|---|---|
| 1 | (¹) | | | 1.23 |
| 2 | 0 | 0.250 | | |
| 3 | 76 | 0.488 | 0.094 | 0.33 |
| 4 | 78 | 0.813 | 0.156 | 0.57 |
| 5 | 78.5 | 0.700 | 0.135 | 0.78 |
| 6 | 79.0 | 0.630 | 0.121 | 0.91 |
| 7 | 79.5 | 0.868 | 0.167 | 1.19 |
| 8 | 80.0 | 0.780 | 0.150 | 1.54 |
| 9 | 80.5 | 0.872 | 0.168 | 2.12 |
| 10 ² | 100 | 0.048 | 0.009 | |
| | | 5.449 | ³ 1.000 | Σ=1.13 |

¹ Polymer sample.
² Viscosity not determined on this fraction due to small quantity involved.
³ Weight fraction calculated excluding solution No. 2 (soaps and resins onstituted about 5% by weight of the polychloroprene tested).

The polymer sample was a 7% by weight solution of the polychloroprene, prepared as described above, in benzene. The second container of the series contained methanol for the purpose of extracting the soaps and resins admixed with the polychloroprene. All of the containers 3–10 were 500 ml. glass tubes and were immersed in a constant temperature bath maintained at 25° C. The speed of the conveyor belt was 4½ inches per minute and the polychloroprene coating was dried by a stream of nitrogen between solutions. The process was conducted for 7½ hours during which time greater than 5 grams of polychloroprene was fractionated.

The molecular weight determination was done as follows. The volume of liquid in each of the tubes containing fractionating solvent (tubes 3–10) was reduced to approximately 75 ml. by rapidly bubbling nitrogen therethrough. This volume of liquid in each tube was transferred quantitatively to separate 250 ml. volumetric flasks, and each liquid was diluted to the mark with benzene. Aliquots were taken to determine the quantity of polychloroprene in each fraction. Subsequent aliquots of such size that 0.1 g. of polychloroprene polymer was present in each aliquot were taken and each diluted to 100 ml. Viscosities were run at 30° C. on these subsequent diluted aliquots. The weight fraction and viscosity results are listed in the table. These results compare very favorably with results obtained by batch-wise treatment by either the fractional precipitation or fractional extraction methods of the prior art wherein only about 0.5 gram of polychloroprene, prepared as described above, is fractionated in a period of several days.

The process of the invention is applicable to all other polymeric materials, including copolymers which are sequentially dissolvable by a series of liquids having graded solvent properties. Those skilled in the art can determine by routine experimentation which solvents to be employed for fractionating a particular polymer. It is obvious to one skilled in the art that the polymeric material must be homogeneous for fractionation by sequential solution into increasing molecular weight fractions. Mixtures of polymers can be fractionated according to the process of the present invention and each polymer will be fractionated in accordance with its own solubility.

Figure 2:
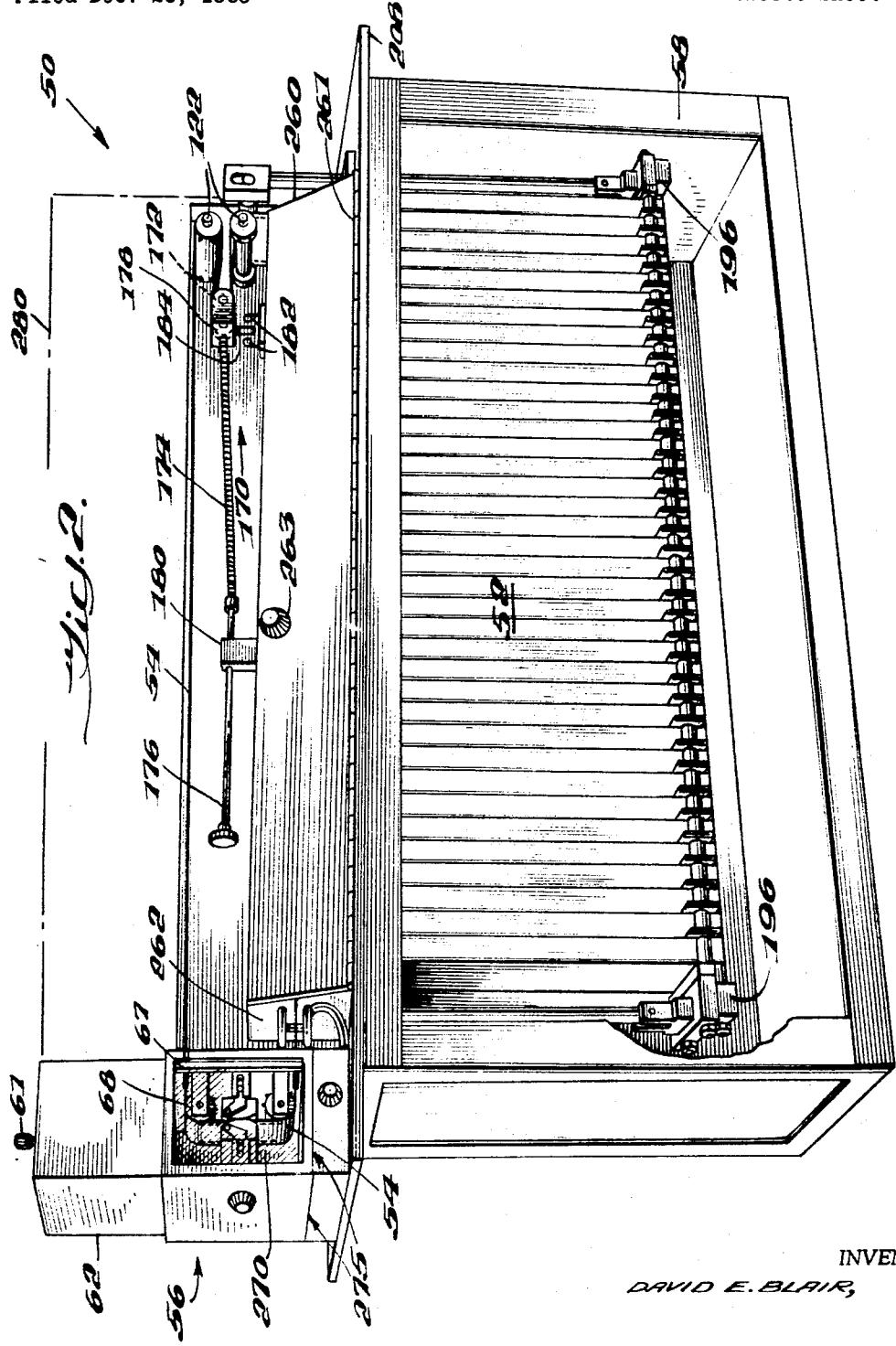
FIG. 2 is a diagrammatic view of apparatus incorporating features of the present invention for subjecting materials to repetitive treatment with fluids and paricularly for continuous polymer fractionation.

With reference to the remaining drawings, FIG. 2 shows a novel apparatus 50 for subjecting materials to repetitive treatment with fluids and particularly for fractionating polymers according to the process of the present invention. For convenience, the apparatus 50 will be described hereinafter with reference to the latter usage although the use of this apparatus is by no means to be restricted thereto. Other applications of the apparatus will become obvious to those skilled in the art upon publication of this specification.

The polymer fractionator 50 is generally comprised of a series of receptacles 52 for receiving the liquids of graded solvent strength, with the strongest solvent being contained by the receptacle at the far right; continuous transfer means, namely, a conveyor belt 54 for conveying the polymer to be fractionated through receptacles 52; polymer applying mechanism 56 for depositing polymer onto the conveyor belt 54; a conventionally equipped constant temperature bath 58 for maintaining the liquid contents of the receptacles 52 at the same relative temperature; and means for agitating the receptacles 52.

Figure 3:
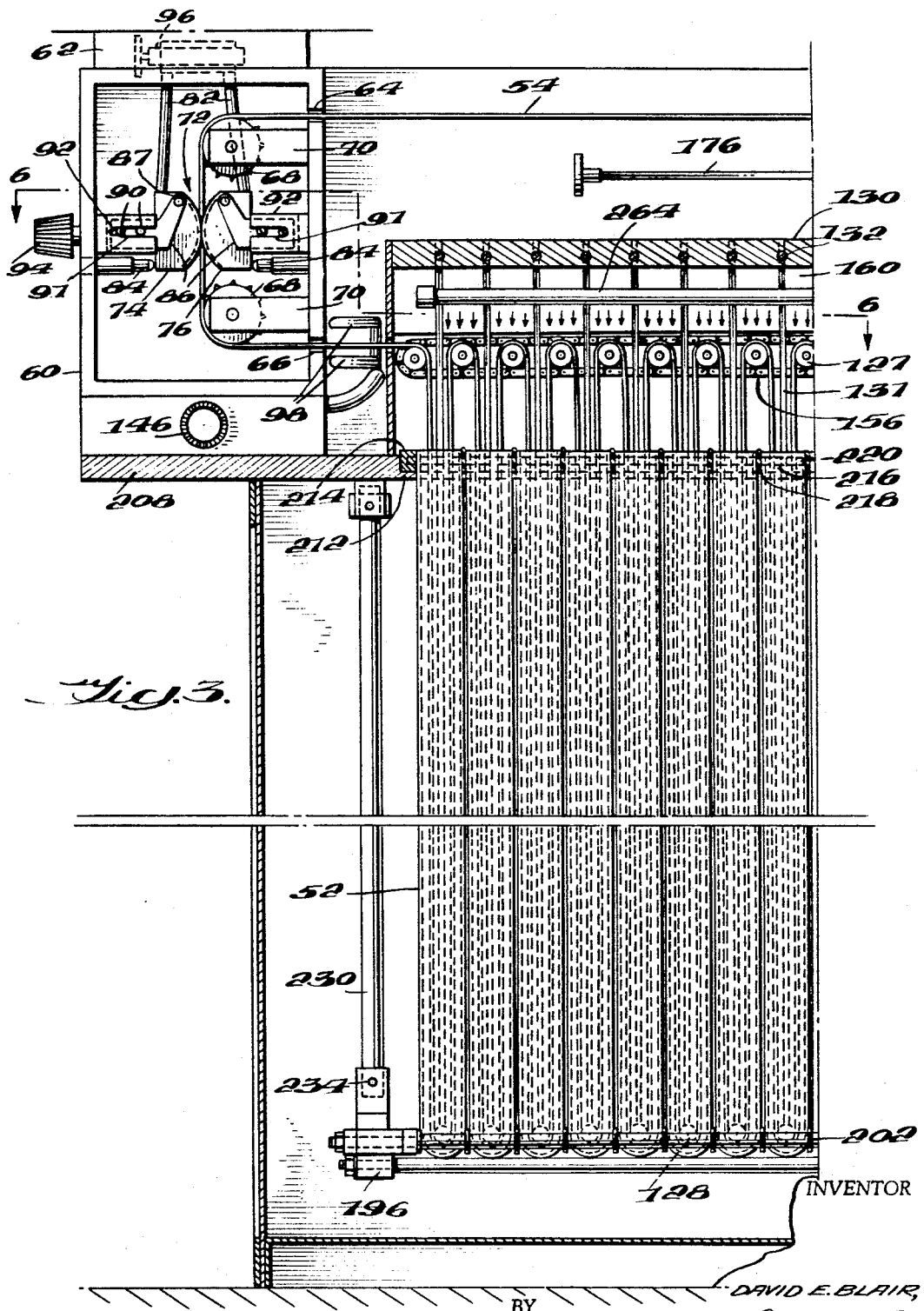
FIG. 3 is a front elevation, partially in section, of one end of the apparatus of FIG. 2.
Figure 6:
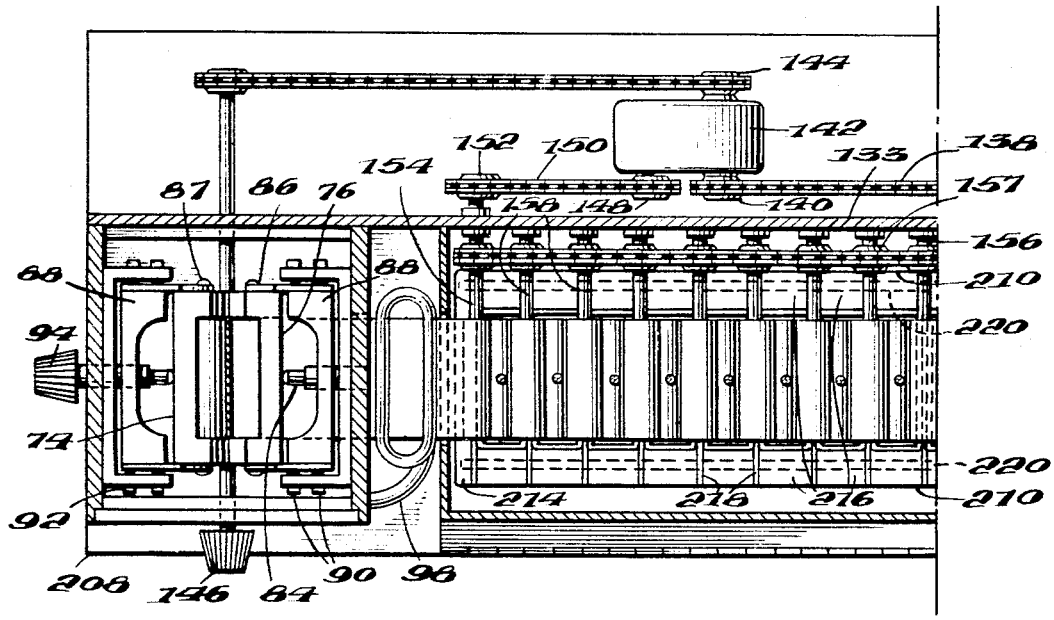
FIG. 6 is a plan view along line 6—6 of FIG. 3.

In further detail, the polymer applying mechanism 56 as best shown in FIGS. 3 and 6 includes a housing 60 and a reservoir 62 of polymer solution mounted on top thereof. A dipstick 61 (FIG. 2) is provided for checking the level of polymer solution in the reservoir. Housing 60 is provided with upper and lower slots 64 and 66 for entry and exit, respectively, of the conveyor belt 54. An upright support 67 (FIG. 2) is provided to stabilize the section of housing 60 lying between these slots. A pair of sprockets 68 journalled between upper and lower brackets 70 are provided for changing the direction of the conveyor belt and guiding it through the polymer coating region designated generally as 72.

Figure 7:
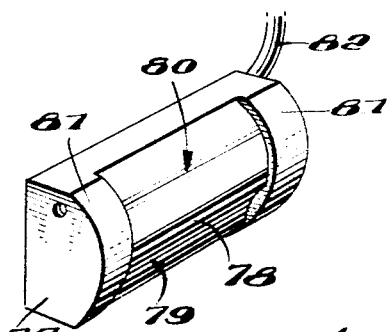
FIG. 7 is a diagrammatic view of a polymer coating member.

The mechanism in this region includes a pair of coating members 74 and 76 having opposed arcuate faces encompassing the faces of the conveyor belt 54. FIG. 7 shows the arcuate face of coating member 74 having a longitudinal opening 78 midway its height and a concavity 79 spaced below the opening 78. The portion of the arcuate face containing the opening 78 is recessed, as is designated by 80, to form lateral shoulders 81. Polymer solution is supplied by supply tube 82 extending between reservoir 62 and the rear of the coating member 74. The coating member contains an interior passage (not shown) communicating between the outlet of supply tube 82 and opening 78, whereby polymer solution delivered by supply tube 82 emerges from the opening 78.

The coating member 76 has these same features as member 74. The shoulders 81 of these coating members are maintained in abutting contact as shown in FIG. 3 by the action of spring-loaded projections 84 thrusting against the lower edges thereof. The recess 80 in each of the coating members 74 and 76 is of such combined width and the conveyor belt sufficiently narrow in width that it freely passes between the coating members.

The coating members 74 and 76 are pivotally mounted near their upper edge by pairs of angularly extending arms 86 and pivot pins 87. Each pair of arms 86 is connected to a backing member 88 so as to be movable therewith. Each arm 86 has lateral projections 90 slidably received in their respective slots 91 formed in the extending arms of brackets 92 for guiding the movement of the arms 86, with the rear of the right hand slots 91 forming a reference surface for aligning the coating members 74 and 76 in the vertical path of the conveyor belt 54. Movement of the arms 86 is obtained by means of an adjustment screw 94 which is in threaded engagement with a wall of housing 60 and is rotatably secured to the adjacent backing member 88, so that when the screw 94 is threaded inwardly or outwardly with respect to the housing 60, said adjacent backing member 88 moves from left to right and oppositely, respectively.

The left to right movement, for example, is accompanied by a corresponding inward thrust on the upper edge of coating member 74 which is translated into a pivoting motion thereof and a like following motion of coating member 76 about pins 87 for the purpose which will now be described. By this pivoting movement, the spring-loaded projections 84 are depressed and the longitudinal openings 78 of the coating members, which openings are normally horizontally facing, tilt downwardly with respect to the conveyor belt 54. The effect of this downward tilting is to increase the effective space between the openings 78 and the conveyor belt, whereby the flow of polymer solution increases to increase the thickness of the coating applied to the conveyor belt. Retraction of adjustment screw 94 has the opposite effect in reversing the direction of tilt of the openings 78 by the pressure of spring-loaded projections 84 acting on the bottom edges of the coating members 74 and 76. Coarse adjustment of the flow of polymer from the openings 78 is obtained by valve 96 (FIG. 3) located behind the reservoir 62 and controlling a single outlet passage (not shown) therein which branches to the pair of supply tubes 82 of reservoir 62. Preferably, the width of the polymer coating lies between the teeth portions of sprockets 68 and all other sprockets so that the coating is not subsequently removed thereby.

Solvent is removed from the polymer coating as the conveyor belt 54 emerges from housing 60 through lower slot 66 by directing an inert gas against the polymer coating by means of a lower and upper section of manifold tube 98.

FIGS. 8 and 9 show another embodiment of a polymer applying mechanism in which the polymer solution is applied to the surface of conveyor belt 54 through a pair of opposed longitudinal slots 99 formed, one each, in a pair of tubular elements 100 encompassing said belt. The tubular elements 100 are each connected by flexible couplings 102 to supply tubes, such as tubes 82 of the previous embodiment, which communicate with the reservoir 62. The tubular elements 100 are secured to the opposed convex surfaces formed in a pair of plates 103 and 104. These plates are pivotally mounted to change the tilt of the longitudinal slots as in the previous embodiment except that the coordination between the pivoting motion is made positive by two pairs of coacting gear segments 106 connected to each end of the plates 103 and 104. The gear segments 106 of each pair are made adjustable towards and away from each other, for adjusting the spacing between the tubular elements 100, by means of the holes receiving the bolts 105 in said segments being made slightly enlarged. The movement of the driving plate 103 in this embodiment is obtained by pivoting about a pivot shaft 107 extending through the length of the plate. The shaft 107 is stabilized by having its head portion in threaded engagement with a nut 108 fastened to apertured U-shaped bracket 109 mounted on the wall of housing 60. A flat spring 110 is fastened by bolts 112 to the rear of plate 103.

The pivoting movement of the plates 103 and 104 is obtained by an adjustment screw 111 which is in threaded engagement with housing 60 and has its end in contact with the reinforced depending portion 114 of spring 110. As the adjustment screw 111 is threaded inwardly, the depending portion of the spring moves from left to right to rotate the plate 103 upwardly about pivot shaft 107. The plate 104 rotates a corresponding amount about rounded ends 116 of a pair of spring-loaded pins 118. When adjustment screw 111 is turned in the opposite direction, the spring tension of the upper portion of spring 110 pivots the plate 103 downwardly and the plate 104 pivots similarly.

As can best be seen from FIG. 9, the pivot shaft 107 can be withdrawn from the plate 103 and U-shaped bracket 109 by unthreading from the nut 108 whereupon members 103 and 104 become disassembled and removable, along with the tubular elements 100, from housing 60. The retractability of the pins 118 is increased by means of a plate 119 bearing a knob 120 and attached to the rear of the pins 118.

To describe conveyor belt 54 in greater detail, the belt is threaded in closed loop fashion as best shown in FIG. 2 around end sprockets 122 and sprockets 68. Conveyor belt 54 is also guided into and out of each of the receptacles 52 by intermediately spaced upper sprockets 127 and lower sprockets 128 as shown in FIGS. 3 and 4.

All of the sprockets 122 and 127 are rotatably mounted to a vertical mounting plate 133 and lower sprockets 128 are rotatably mounted at the end of supports 131 depending into each receptacle from a shelf plate 130 mounted to plate 133. The supports 131 are vertically adjustable through apertures in the plate 130 and are stabilized by means of screws 132.

The conveyor belt is perforated adjacent its edges for engagement with the teeth of these sprockets. The conveyor belt 54 is made of material that is unaffected by the solvents. A particularly useful conveyor belt material for fractionation of many polymers is "Mylar" polyester film. The conveyor belt can have roughened surfaces to promote adherence of the polymer coating thereto.

A representative driving mechanism for the conveyor belt 54 comprises a motor 134 positioned adjacent the right side of the fractionator 50 and having a driving sprocket 136 and a driving chain 138 threaded over it and a pair of sprockets 139 (FIG. 5) and 140 (FIG. 6), the latter of which powers a continuously variable speed reducer 142. A sprocket 144 is mounted on the speed adjustment input shaft of the reducer 142 and the adjustment of sprocket 144 is obtained by means of knob 146 operatively connected thereto as shown. A sprocket 148 is mounted on the speed adjusted output shaft of the reducer 142 and drives chain 150 and sprocket 152. The latter is connected with the first upper sprocket 127 to obtain driving thereof by means of a shaft 154 which is journalled in plate 133.

The motion of sprocket 127 is transmitted to the remaining upper sprockets 127 by means of a chain 156 trained over intermediately spaced chain sprockets 157 mounted on the shafts 158, which are journalled from plate 133 and secured to each sprocket 127. Optionally, an intermediately spaced sprocket 157 can be provided for every other, every third, or with even less frequency for the shafts 158. A guide block 160 is provided overlying the upper flight of the path of chain 156 to maintain engagement between it and the intermediately spaced sprockets.

Figures 11, 12:
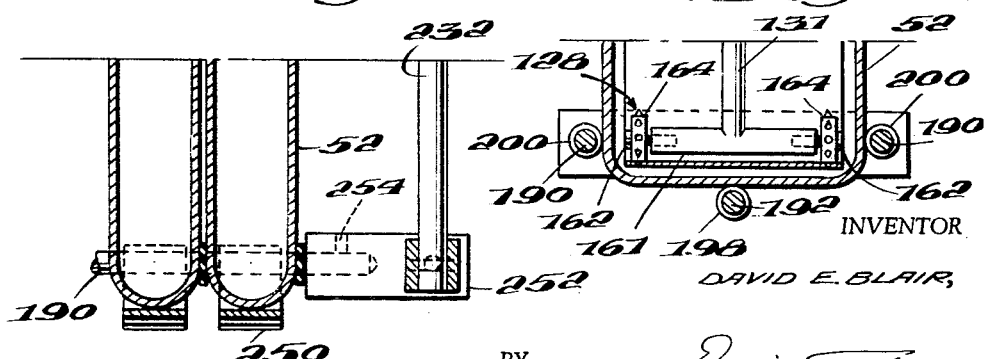
FIG. 11 is a front elevation of the apparatus shown in FIG. 10.
FIG. 12 is a side elevation view of a lower sprocket of the present invention.

In FIG. 12 is shown a representative lower sprocket 128 which is retained immersed in the receptacle 52 by support 131. The support 131 includes a T-shaped branch 161 having opposed end passages for receiving in a press fit a pair of headed dowels 162. The sprocket 128 consists of a pair of cylinders 164 having short axial length and greater diameter than that of the branch 161. The cylinders 164 are rotatably mounted on the headed dowels 162 and have sprocket teeth for engaging the conveyor belt. Because of the relationship between diameters of the cylinders 164 and the branch 160, the polymer coating on the conveyor belt is separated from the latter for the purpose of avoiding rub-off of the coating. The upper sprockets 127 and at least the lower of the sprockets 68, while they can be constructed each as a unit, have a configuration similar to that of the sprocket 128 for the same purpose.

A safety mechanism, designated generally as 170 in FIG. 2, is provided to halt operation of the motor 134 in case of excessive slack or pull by the conveyor belt 54 as would occur if the conveyor belt broke and jammed. The safety mechanism consists of a loop formed in conveyor belt 54 between the end sprockets 122, with an idler sprocket 172 retained in the loop by a spring 174 connected between a rod 176 and a journal block 178. Rod 176 is threadably received by a stationary mounting post 180 mounted on shelf plate 130. The actuating arms 182 of a pair of microswitches are positioned before and after an actuating element 184 which depends from the journal block 178. The microswitches are interposed in the power supply so that excessive movement of the idler sprocket 172 results in a tripping of one of the actuating arms 182 to halt operation of the motor 134.

To describe the arrangement of receptacles 52 in greater detail, FIGS. 2–5 show the receptacles aligned in a vertical plane with the bottoms of the receptacles connected into a unit by transversely positioned rods 190 and 192 exerting a clamping force by means of nuts 194 on oppositely positioned end blocks 196. FIG. 5 shows the triangular relationship of the rods 190 and 192. Rods 190 and 192 are covered by plastic cylinders (FIG. 12), the former in a continuous length 198 and the latter in short sections 200 abutting transversely positioned spacers 202.

The mounting of the upper portion of the receptacles 52 will now be explained. A base plate 208 is positioned over the top of the constant temperature bath 58 and is provided with an annular cut-out, a portion of which is generally outlined as line 210 in FIG. 6, to permit positioning of the receptacles 52 therein. The annular cut-out is provided with a peripheral lip 212 formed integral with the plate 208, with the lip 212 at the ends of the annular cut-out being best shown in FIGS. 3 and 4. A pair of end blocks 214 are secured to the lips 212 at ends of the cut-out. Positioned between the end blocks 214 are rows of spacer blocks 216 extending along each side of the annular cut-out in plate 208 and resting on the peripheral lip 212 thereof. As shown in FIG. 6, a pair of spacer blocks 216 is provided for each receptacle 52, and each block 216 has its inner side conforming generally to the adjacent side of the receptacle. Between adjacent pairs of spacer blocks 216 and receptacles 52 is positioned compressed tubing 218 of low friction material such as "Teflon" fluorocarbon polymer. The entire assembly of spacer blocks and compressed tubing is stabilized by a pair of rods 220, extending through each thereof and secured to the end blocks 214.

As shown in FIGS. 2–5, the series of receptacles 52 are supported in the constant temperature bath 58 by vertically extending rods 230 and 232 which are pivotally connected to their respective end blocks 196 by pivot pins 234 and are pivotally connected to plate 208 by means of a cross member 236 journalled between spaced supports 238. Hence, it is seen that the lower edges of the series of receptacles can be moved or oscillated relative to the previously named elements 54, 128, and 131 contained therein, with the upper edges of the receptacles 52 pivoting within spacer blocks 216. The compressed tubing 218 provides a low friction surface between the upper ends of adjacent receptacles during this pivoting. The same tubing can be employed for the spacers 202. The tubing 218 also conforms generally to the side configuration of each receptacle, thereby isolating the atmosphere in the chamber above the receptacles from the constant temperature bath.

The oscillating motion of the series of receptacles 52 is obtained, as is best shown in FIGS. 4 and 5, by driving an upper extension 240 of rod 232 in like fashion. This driving is obtained by an eccentric pin 242 mounted on the end of a shaft 244 which is driven by sprocket 139. The eccentric pin 242 is slidably received in a vertical slot 246 contained in block 248 positioned at the head of the extension of rod 232. The amplitude of oscillation is maintained sufficiently small so that the elements 54, 128, and 131 do not contact the interior surfaces of receptacles 52.

The purpose of oscillating the receptacles 52 as previously explained is to agitate the liquid contents of the receptacles 52 to obtain complete penetration of solvent and extraction of the particular molecular weight fraction from the polymer coating contained on the conveyor belt 54. Oscillation of the receptacles 52 as a unit has the advantage of eliminating the need for an individual stirrer for each receptacle.

A rocking motion of elongated containers, such as receptacles 52, would normally not provide sufficient agitation, particularly near the bottoms of the containers. However, satisfactory agitation is obtained by the apparatus of the present invention by the presence of the conveyor belt 54 which is stabilized against transverse movement by sprocket supports 131 and upper and lower sprockets 127 and 128. Accordingly, the conveyor belt acts as a barrier to prevent the fractionating solvents from oscillating in a quiescent state along with the receptacles 52.

Figure 10:
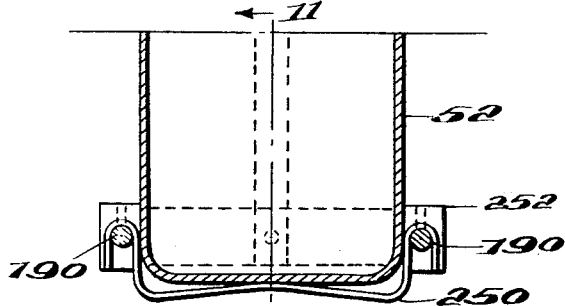
FIG. 10 is a side elevation, partially in section, of another embodiment for the lower mounting of the solvent receptacles.

FIGS. 10 and 11 depict another arrangement for mounting the lower ends of receptacles 52, in which cylinders 200 and rod 192 are replaced by U-shaped hanger straps 250 strung between rods 190 extending on each side of the receptacles 52, and the rods 190 are retained in end block 252, of simpler construction than block 196, by means of transverse screws 254.

In order to preserve the polymer coating in a swollen condition during its travel between adjacent receptacles 52, a hood 260, shown in FIG. 2 and hinged at 261, is provided to mate wtih the shelf plate 130 and end walls 262 to form an enclosure or chamber above the open ends of receptacles 52. Knob 263 controls a latch for tightly securing the hood 260 in the closed position. An inert atmosphere is maintained within this enclosure by an inert gas such as nitrogen being supplied by a manifold pipe 264. The inert gas is saturated with fractionating solvent of intermediate strength in compartment 266, shown in FIGS. 5 and 6, and is supplied to the manifold pipe 264 by means of a removable section of tubing 268. The solvent saturated, inert atmosphere so obtained prevents evaporation of fractionating solvent from the exposed portions of the polymer coating. A window 270 prevents such evaporation from occurring within housing 60 of the polymer applying apparatus 56.

In operation, a polymer coating of the desired thickness is applied to the conveyor belt 54 which is then advanced through the agitated receptacles 52 containing liquids in the order of progressively increasing solvent strength, whereby fractions of different molecular weight are simultaneously and sequentially removed from the coating. By selecting a solvent of sufficent strength to dissolve all of the polymer coating remaining at entry into the last receptacle of the series, the conveyor belt 54 is stripped of polymer coating to present a polymer-free belt surface for recoating by mechanism 56. It is thus seen that the apparatus of the present invention can fractionate a relatively large polymer sample in automatic and continuous fashion and in a short period of time. It is also seen that the manner of agitating the fractionating solvents or any other treating liquids provides a distinct simplification of equipment by eliminating the need for individual stirrers.

Upon conclusion of the fractionation of a polymer sample, the various solvents containing the polymer fractions can be removed from the receptacles 52 by transfer tubing (not shown) connected to a vacuum source and emptying into separate solvent evaporating receptacles (not shown).

To facilitate threading of the conveyor belt 54 over the various sprockets, the mounting plate 133 is made separable from base plate 208, and all apparatus related to the threading, viz., sprockets, supports, and the polymer applying mechanism, are attached to the mounting plate. The polymer applying mechanism is separable along line 275 shown in FIG. 2.

A central control panel 280 can be provided (as shown in phantom lines in FIG. 2) containing appropriate switches or indicating devices relating to the operation of apparatus 50, such as power, conveyor drive, speed agitation drive, bath temperature, and inert gas supply.

As many widely different embodiments of this invention may be made without departing from the spirit and scope thereof, it is to be understood that this invention is not limited to the specific embodiments thereof except as defined in the appended claims.

What is claimed is:

1. A process for fractionating a polymer, comprising applying said polymer to a substrate, simultaneously contacting successive portions of said polymer applied to said substrate with liquids having progressively increasing solvent strength for said polymer, and advancing said substrate through said liquids in the sequence that said portions of said polymer pass to liquid of progressively increasing solvent strength, whereby fractions having increasing molecular weight are simultaneously and sequentially removed from said polymer by said liquids.

2. The process of claim 1, wherein said substrate is a solvent resistant conveyor belt.

3. The process of claim 1, wherein the liquid contacting the last successive portion of said polymer applied to said substrate is of sufficient solvent strength to dissolve all of said polymer.

4. The process of claim 1, wherein said liquids are maintained at a constant temperature.

5. The process of claim 1, wherein the advancing step is carried out concurrently with the simultaneous contacting step.

6. The process of claim 1 and additionally, contacting said polymer applied to said substrate where exposed from said liquids with a substantially solvent saturated inert atmosphere.

7. A polymer fractionator comprising (1) a constant temperature bath, (2) a series of receptacles positioned within said bath for containing liquids of progressively increasing solvent strength for said polymer, (3) transfer means including an endless conveyor belt having looped portions simultaneously communicating with said liquids contained in said receptacles and means for advancing said conveyor belt through said liquids, (4) means for applying said polymer to said conveyor belt including a pair of members encompassing said conveyor belt therebetween and having opposing slots for distributing liquid polymer on the surfaces of said conveyor belt, said members being rotatable to a limited degree to correspondingly change the tilt of said opposing slots with respect to the surfaces of said conveyor belt for changing the thickness of polymer coating applied thereto, and (5) means agitating said liquids contained in said receptacles for effective contact with said polymer.

8. The polymer fractionator of claim 7, wherein said agitating means includes means connecting said receptacles into a unit and means moving said unit relative to said looped portions of said conveyor belt and said polymer applied thereto.

References Cited

UNITED STATES PATENTS

| | | | |
|---|---|---|---|
| 623,837 | 4/1899 | Schwarz | 95—94 |
| 1,172,074 | 2/1916 | Townes | 95—94 |
| 2,840,459 | 6/1958 | Karnofsky | 260—412.8 |
| 3,207,828 | 9/1965 | Petersen et al. | 260—92.3 |

JOSEPH L. SCHOFER, *Primary Examiner.*

H. I. CANTOR, W. F. HAMROCK,
*Assistant Examiners.*